W. A. DOBSON.
TORPEDO PROTECTION FOR CARGO AND OTHER VESSELS.
APPLICATION FILED JULY 14, 1917.

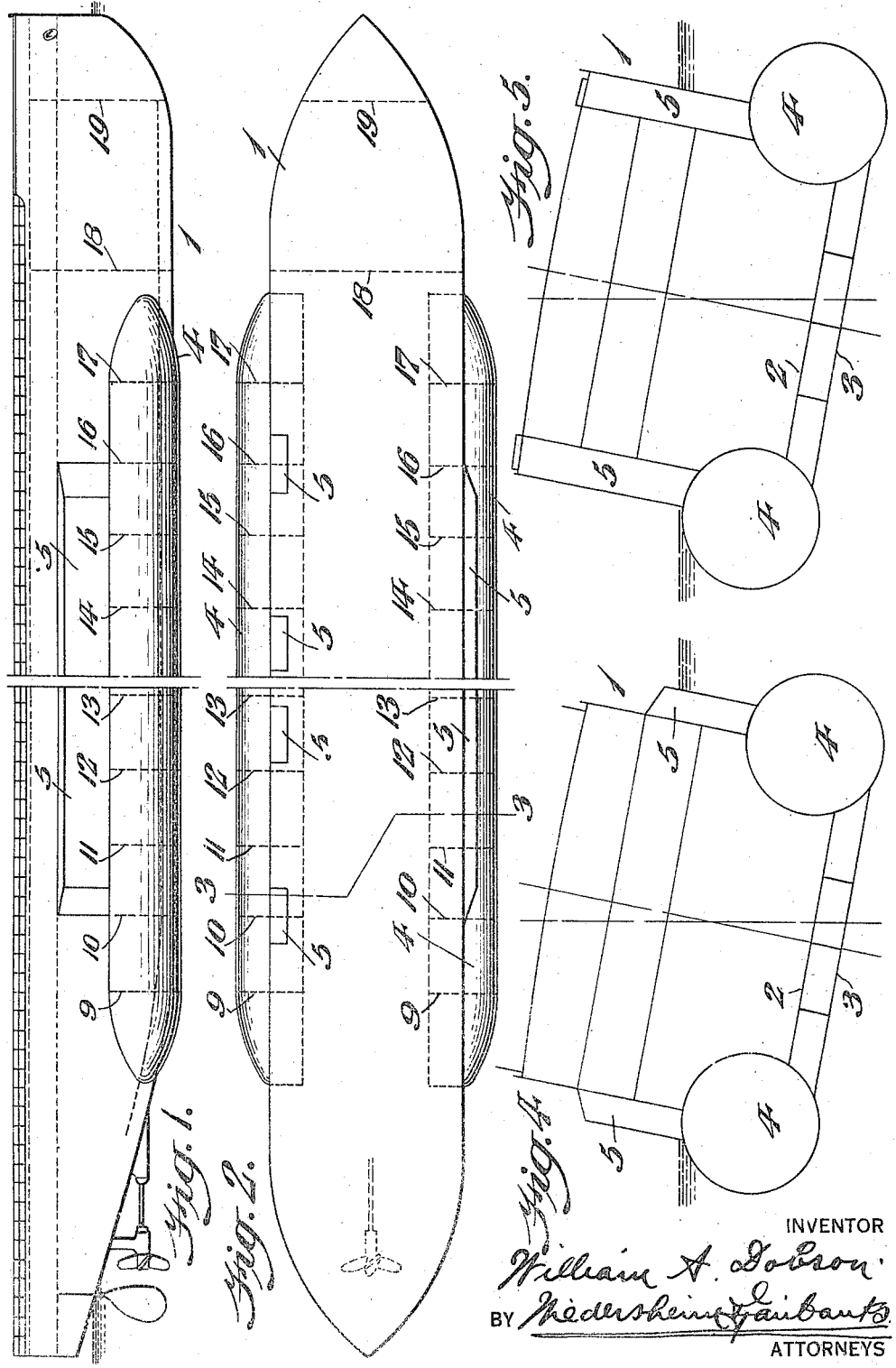

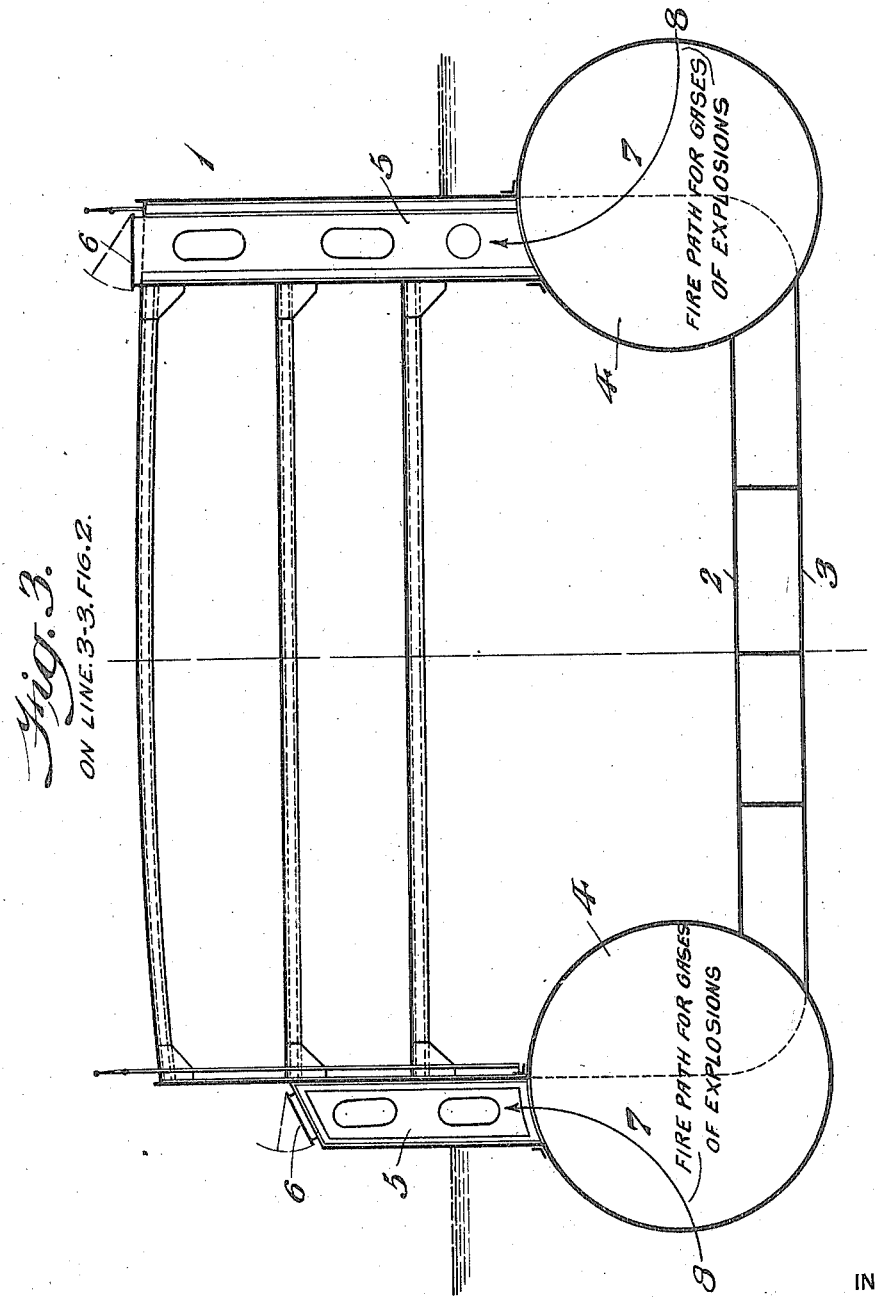

1,264,620.

Patented Apr. 30, 1918.
3 SHEETS—SHEET 3.

INVENTOR
William A. Dobson
BY
ATTORNEYS

UNITED STATES PATENT OFFICE.

WILLIAM A. DOBSON, OF PHILADELPHIA, PENNSYLVANIA.

TORPEDO PROTECTION FOR CARGO AND OTHER VESSELS.

1,264,620.　　　　　　　Specification of Letters Patent.　　Patented Apr. 30, 1918.

Application filed July 14, 1917. Serial No. 180,521.

*To all whom it may concern:*

Be it known that I, WILLIAM A. DOBSON, a citizen of the United States, residing in the city and county of Philadelphia, State of Pennsylvania, have invented a new and useful Torpedo Protection for Cargo and other Vessels, of which the following is a specification.

My invention relates to cargo and other vessels, and consists more particularly of a novel device for protecting those portions of the vessel which are liable to torpedo attack and to contact with floating mines, said device comprising in its broad aspects one or more longitudinally extending cylinders, tubes or drums, having upright vent trunks, which provide a free exit for the gases of explosion through a free path to the atmosphere of least resistance, the foregoing being collocated with the vessel in the novel manner hereinafter set forth.

It has heretofore been proposed in the construction of floating vessels, to provide an explosion chamber having concave and convex walls formed by the cellular construction of the vessel proper but without any vents to the atmosphere for the gases of the explosion, the entire force of the torpedo explosion being expended upon the ship's structure, and there being no paths of least resistance provided for the escape of the gases.

To obviate the foregoing disadvantages of the prior art, I employ in my present invention a longitudinally extending cylinder, tube or drum, having preferably a convex exterior and a concave interior worked into the structure of the vessel on each side below the water line thereof, for such length as may cover the more buoyant portions or those which if bilged by an explosion would ordinarly cause the vessel to sink.

By my novel construction I create spaces or compartments independent from the interior spaces and construction members of the vessel for the expansion of the gases of the explosive, and in addition I provide vents or vent trunks either inside or outside the vessel, which extend upwardly from said spaces or compartments to the atmosphere, thereby allowing an exit for such gases of explosion by a free path of least resistance, the walls of said compartments being interiorly concave and exteriorly convex, due to the fact that I employ a tubular construction which is the simplest form of construction, and which can be readily divided into any desired number of compartments by diaphragms or bulkheads extending transversely or longitudinally, as may be desired.

By the provision of the vent trunks, which may be provided at their upper or top portion with covers, which may be lifted when the vessel is in a war zone, I provide a free exit for the gases generated in the explosion by a path to the atmosphere of least resistance, said trunks being interiorly or exteriorly located, and a free exit to the atmosphere being therein provided for the gases of explosion.

By reason of my novel construction, not only is the vessel and the hull thereof protected, but in addition the vessel has increased stability even when heeled by the admission of water due to injury to the tubes, my novel construction providing to a maximum extent against capsizing, and, in addition, by the employment of my device, any loss of cargo space is reduced to a minimum.

To the above ends my invention consists in combination with the vessel of a novel construction of longitudinally extending tubes, cylinders or drums preferably exteriorly convex and interiorly concave worked into the lower portion of the hull or vessel structure for such length as may cover the more buoyant portions, said cylinders, tubes or drums being in free and unobstructed open communication with upright vent trunks located inside or outside the vessel, whereby a large area is provided for expansion of the gases of explosion, which latter are provided with a free path of least resistance to the atmosphere, so that the entire force of the torpedo explosion is not expended upon the ship's structure, but is conducted upwardly and outwardly away therefrom.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a torpedo protection device for cargo and other vessels embodying my invention.

Fig. 2 represents a plan view of Fig. 1.

Fig. 3 represents a section on line 3—3 Fig. 2.

Figs. 4 and 5 represent diagrammatic transverse views showing the positions my novel vessel may assume at sea, the vent trunks in Fig. 5 being of greater length than the vent trunks of Fig. 4.

Similar numerals of reference indicate corresponding parts.

Referring to the drawings:—

Figure 6:
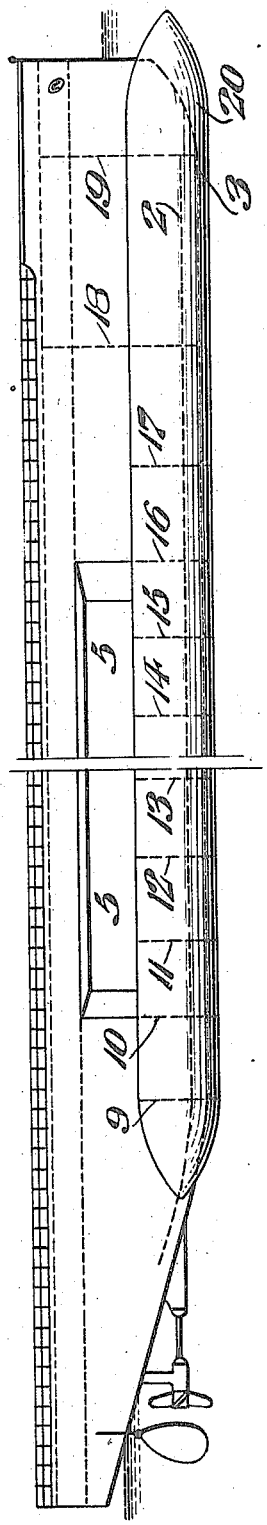
Figs. 6 and 7 represent a side elevation and a plan view of another embodiment of my invention.

1 designates my novel construction of torpedo protection device for cargo and other vessels, wherein 2 and 3 designate the inner and outer hulls. 4 designates a longitudinally extending tube, cylinder or drum, which is located on the lower outer portion of the vessel on each side below the water line thereof and is worked into the structure of the vessel for such length as may cover the more buoyant portions thereof.

5 designates upright vertically extending vent trunks, which may be located either inside or outside the vessel and may be of varying lengths, as will be understood from Fig. 3, said vent trunks being provided at their top or upper portion with covers 6, which may normally be closed but which are lifted when the vessel is in the war zone, so as to afford the gases of the explosive a free and unobstructed outlet to the atmosphere.

I preferably employ the tubular or cylindrical construction or contour for the tubes 4, since a tube is one of the simplest forms of construction and it can be readily incorporated in the vessel structure, as will be apparent to those skilled in the art, and, in addition, the drums, tubes or cylinders 4 can be readily divided into compartments by diaphragms or bulkheads, which may extend either transversely or longitudinally, as may be desired, whereby chambers as 7 of large area are provided for the expansion of the gases of explosion, said gases having a free and unobstructed path to the atmosphere by a free path of least resistance through the vent trunks 5, as will be evident, the paths for the gases of explosion being indicated at each lower side of Fig. 3 by the arrows 8.

I have deemed it unnecessary to show or describe in detail the precise manner of riveting, assembling or collocating the cylinders 4 and the vent trunks 5 with respect to the hull or vessel proper, and since I am the first in the art to produce this novel concrete unitary structure, I do not desire to be limited to any precise manner of assembling said longitudinally extending cylinders, drums or vent trunks with respect to the vessel, as the same may be assembled and collocated in various different ways, and the cylinders 4 may be positioned slightly differently with respect to the vessel structure, without departing from the spirit of my invention, as will be evident to those skilled in the art.

It will further be apparent that said vent trunks 5 may be located either inside or outside the vessel, as is evident.

In the construction seen in Figs. 1 and 2, I preferably arrange diaphragms and bulkheads, as indicated in dotted lines, 9 and 10 indicating diaphragms, 11 a bulkhead, 12 and 13 diaphragms, 14 a diaphragm, 15 a bulkhead, and 16 and 17 diaphragms, and the dotted lines 18 and 19 bulkheads, it being apparent that I have shown a pair of diaphragms located between a pair of bulkheads, but these details of construction may be varied if desired.

It will be apparent from the foregoing, to those skilled in the art, that in case of the impact of a torpedo with either of the longitudinal cylinders, tubes or drums 4, the gases of explosion will tend to follow the path indicated by the arrows 8 and will follow the free path of least resistance through the vent trunks 5 to the atmosphere, so that the force of the torpedo explosion will not be expended upon the ship's structure, but will follow said path of least resistance through said vent trunks 5, which permit a free and unobstructed exit or escape of the gases of explosion to the atmosphere.

It will therefore be seen that my invention in its broad aspects consists in providing spaces or compartments independent from the interior spaces and construction members of the vessel for the expansion of the gases of the explosive coupled with vents or vent trunks from said compartments to the atmosphere, whereby said gases are permitted a free exit through a path of least resistance.

It will be apparent that while my invention is particularly designed for cargo vessels, it is equally applicable to any other type of floating vessel, and it will further be apparent that by the employment of my novel construction, the vessel possesses increased stability even when heeled by the admission of water due to an injury to the tubes.

It will further be apparent to those skilled in the art, that in my invention only a very small portion of the cargo capacity is utilized by the employment of the longitudinally extending cylinder 4, and my novel construction further provides against capsizing to a greater extent than any other construction with which I am familiar, special attention being directed to the fact that a vessel embodying my invention is practically uncapsizable unless the whole side is bilged.

While I have termed the members 4 as cylinders, tubes, or drums, which construction I preferably employ because of its simplicity, I contemplate the use of equivalent structures, and do not desire to be limited thereto in every instance.

Figure 7:
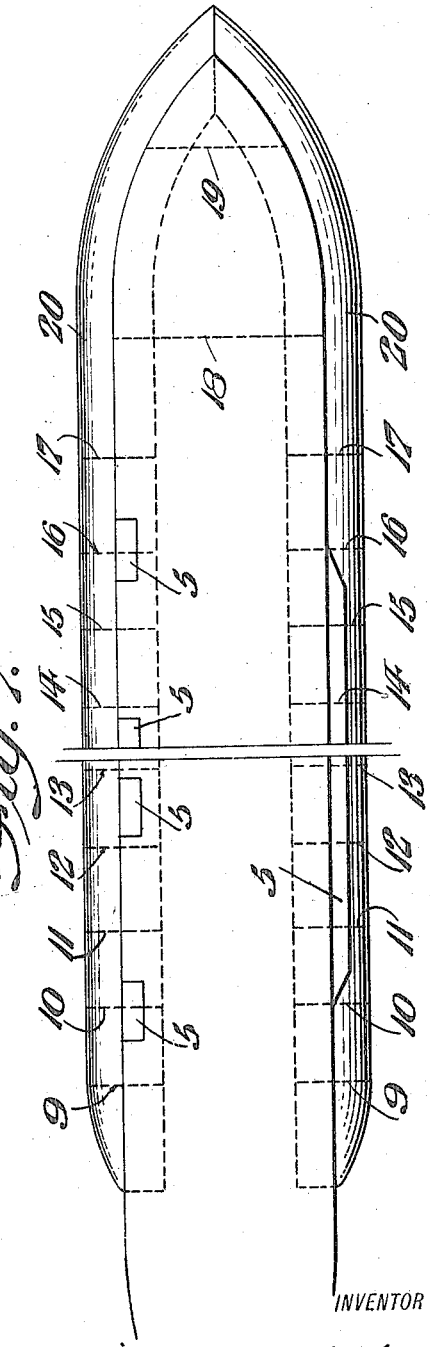

In Figs. 6 and 7, I have shown another embodiment of my invention wherein I construct the longitudinally extending tubes, cylinders or drums in the form of pontoons, as indicated at 20, which extend preferably around the bow of the vessel, as will be understood from the right-hand portion of said Figs. 6 and 7, the arrangement of the upwardly extending vent trunks 5 being substantially as already explained with respect to Figs. 1 to 5 and said vent trunks being arranged either exteriorly or interiorly of the vessel, as may be desired.

By prolonging the drums, tubes, cylinders or pontoons, so that the same terminate at approximately the point shown in Figs. 6 and 7, I provide an additional torpedo protection for the forward portion of the hull of the vessel, the advantages of which will be obvious to those skilled in the art.

It will now be apparent that I have devised a novel and useful construction of torpedo protection for cargo and other vessels, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a cargo or other vessel, a longitudinally extending drum located exteriorly of the vessel at the lower portion of a side thereof, and an upwardly extending vent trunk in communication with said drum.

2. In a cargo or other vessel, a longitudinally extending drum located exterior of the vessel at the lower portion of a side thereof, said drum being exteriorly convex and interiorly concave, an upwardly extending vent trunk in communication with said drum, and a cover at the top of said vent trunk, said cover being normally closed but adapted to be lifted when the vessel is in a war zone.

3. In a cargo or other vessel, a vessel having a longitudinally extending drum located exteriorly thereof at a point below the water line thereof, diaphragms and bulkheads alternately arranged in said drum, and upwardly extending vent trunks in connection with said drum to provide a path of least resistance to the atmosphere of the gases of explosion.

4. In a device of the character described, the combination of a floating vessel, longitudinally extending drums worked into the structure of said vessel below its water line for such length as to cover the more buoyant portions thereof, and vent trunks extending upwardly from said drums to provide paths of least resistance to the atmosphere for the escape of the gases of explosion.

5. In a device of the character described, a vessel having longitudinally extending cylinders or tubes exteriorly convex and interiorly concave worked into said vessel structure at a point below the water line on either side thereof, and upwardly extending vent trunks communicating with the interiors of said tubes for providing a free path of least resistance to the atmosphere for the exit of gases of explosion.

6. In a device of the character described, a vessel having longitudinally extending drums worked into said vessel structure at a point below the water line on either side thereof, upwardly extending vent trunks communicating with the interiors of said drums for providing a free path of least resistance to the atmosphere for the exit of gases of explosion, and diaphragms and bulkheads in said drums.

7. In a device of the character described, a vessel having longitudinally extending drums, exteriorly convex and interiorly concave located exteriorly of the vessel at the lower portion of the sides thereof, diaphragms and bulkheads alternately arranged in said drums, and vent trunks extending upwardly from said drums for providing paths of least resistance to the atmosphere for the escape of the gases of explosion.

WILLIAM A. DOBSON.

Witnesses:
E. HAYWARD FAIRBANKS,
C. D. McVAY.